UNITED STATES PATENT OFFICE.

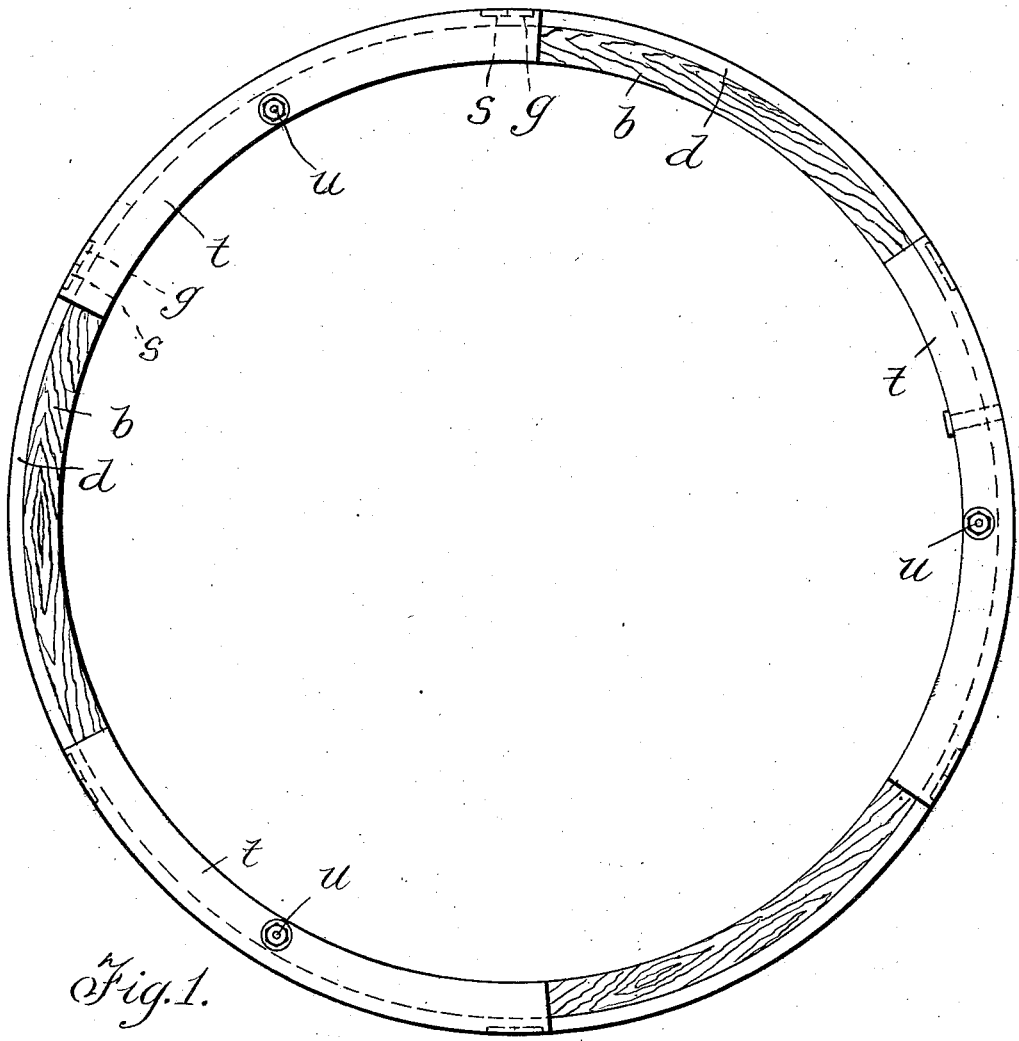
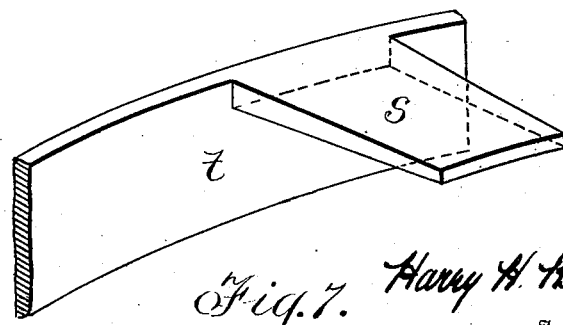

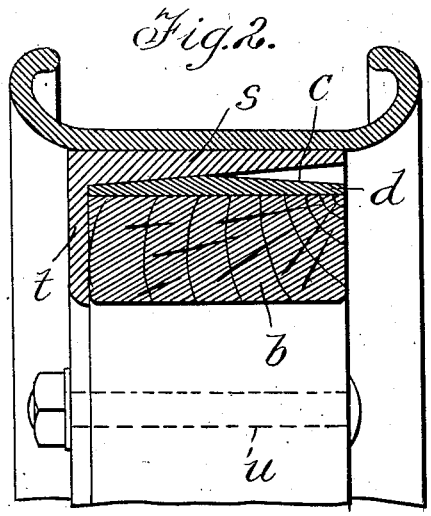
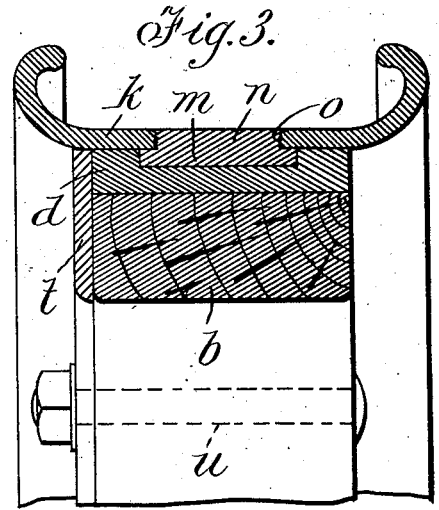
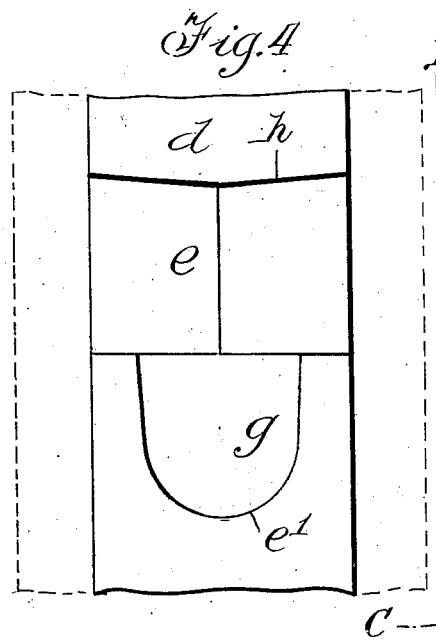
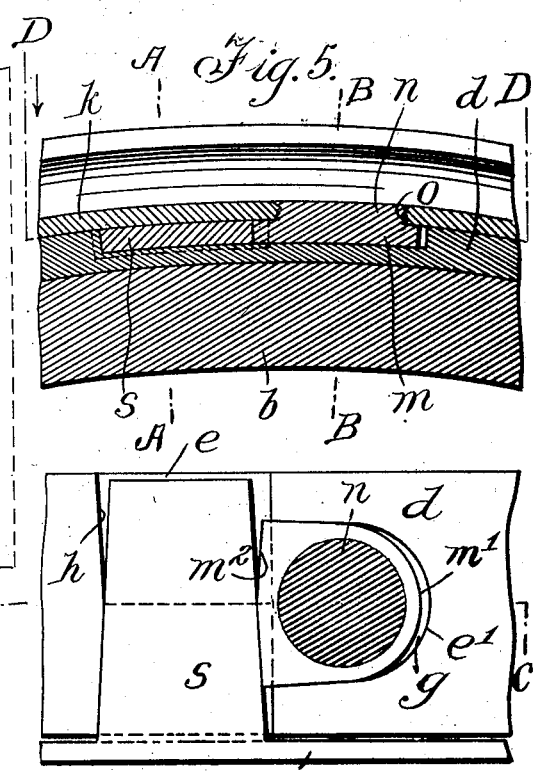

HARRY HINE REPLOGLE, OF MONTREAL, QUEBEC, CANADA.

DEMOUNTABLE WHEEL-RIM.

1,024,746.

Specification of Letters Patent. Patented Apr. 30, 1912.

Application filed April 22, 1910. Serial No. 556,983.

*To all whom it may concern:*

Be it known that I, HARRY HINE REPLOGLE, of the city of Montreal, Province of Quebec, Canada, have invented certain new and useful Improvements in Demountable Wheel-Rims; and I do hereby declare that the following is a full, clear, and exact description of the same.

My invention relates particularly to detachable rims of automobile wheels in which a metal band encircling the felly has angular recesses formed in the periphery thereof and the rim has on its inside surface lugs to enter such recesses and be locked therein and the objects of my improvements are first and mainly to secure by means of a locking key of special formation, not only the necessary locking in place of the rim after it has been located in position but the tight wedging home of the interlocking lugs and a desirable radial wedging connection between band and rim, and secondly, to simplify the form, construction and combination of parts required to carry out the main object of my invention.

The invention consists of the combination and particular construction of parts hereinafter disclosed and pointed out in the claims.

For full comprehension, however of the invention reference must be had to the accompanying drawings forming a part of this specification in which similar reference characters indicate the same parts and wherein—

Figure 1 is a side elevation of felly and rim of a wheel with my invention applied thereto; Figs. 2 and 3 are detail and transverse sectional views of the felly and rim with the key in locking position and taken on lines A A and B B respectively Fig. 5; Fig. 4 is a detail plan view of a section of the metal band encircling the felly and illustrating the recess therein; Fig. 5 is a detail longitudinal sectional view taken on line C C Fig. 6; Fig. 6 is a detail horizontal sectional view taken on line D D Fig. 5; and Fig. 7 is a detail perspective view of the key and its carrier.

The wheel has a felly which, as illustrated at $b$, is of the usual oblong rectangular form in cross section and carries a surrounding metallic band $d$. This metallic band $d$ has a series of recesses of T-form in its outer perimeter, the portion $e$ of each recess being disposed transversely to the band and the portion $g$ circumferentially, the wall $h$ of the portion $e$ being preferably of angular form with its apex in the middle, and the bottom of this same portion of the recess sloping from the center to either end as shown at $c$ in Fig. 2, thus presenting a through passage of double wedge form (having wedging properties both radially and circumferentially) in order to permit a wedging key, hereafter described, to be entered at either side of the wheel and exert a wedging force in two directions as above mentioned, while the sides of the circumferential recess portion $g$ converge symmetrically in a direction away from the transverse portion $e$ and terminate in a rounded end $e'$.

The wheel rim $k$, of the usual form to receive and retain the tire (not shown), carries rigidly a series of lugs $m$ projecting from the inner perimeter thereof, each lug tapered symmetrically throughout its length toward one end, rounded as at $m'$, and having its opposite end $m^2$ inclined in opposite directions from its center and sufficiently wide to enable the lug to become tightly wedged in said circumferential portion of the recess. The lugs $m$ preferably consist of plates having screw-threaded bosses $n$ adapted to be screwed into openings $o$ in the rim, the ends of such bosses being riveted after insertion to lock the lugs in place.

When mounting the rim it is slipped onto the felly from either side, the lugs $m$ entering the recesses $e$, and the rim is then shifted circumferentially until the lugs are seated, but not wedged tightly, in the circumferential portions of the recess, and with a small portion of their ends $m^2$ projecting within the transverse portion thereof, there being sufficient slackness between the parts to permit this assembling to be readily done without the use of any tools, the subsequent driving home and tightening up of the parts being accomplished by the locking key as will now be described.

As a means for forcing the wedging lugs tightly into the circumferential portions of the recesses, establishing a tight connection radially between the band and the rim and retaining the parts in their locked position, I provide a series of segmental plates $t$ having locking or wedging keys $s$ formed integral therewith and projecting laterally from one side of same to enter the transverse portions e of the recesses in the band d, and such keys being tapered both horizontally and vertically not only serve to engage the projecting ends of the lugs and force them tightly into the circumferential portions of the recesses (retaining them in place when so positioned) but also act radially to tighten the rim upon the band. The plates t, after the keys have been driven home, are clamped to the side of the felly by bolts u passed through the latter.

To demount the rim the bolts are first removed and the keys displaced by either prying off the plates or driving a chisel or the like into the opposite ends of recesses e against the ends of the keys.

What I claim is as follows:

1. In a wheel the combination with a felly of uniform oblong rectangular cross section; of a band encircling and fixed to the felly and having a plurality of T-shaped recesses in its periphery one portion of each recess extending transversely of the band and the other portion extending circumferentially centrally thereof and tapering symmetrically throughout its length; a detachable rim having a plurality of fixed lugs each of which is adapted to enter and is sufficiently wide to become tightly wedged in a circumferential portion of a recess; a series of segmental plates having wedging keys projecting laterally from one side of same to enter the transverse portions of the recesses and force said lugs into the circumferential portions thereof, and means for securing said plates to the side of the felly, substantially as described.

2. The combination with a wheel felly, a band encircling same having recesses comprising transverse and circumferential portions in its periphery, a rim having wedge lugs on its inside surface adapted to enter and be wedged in the circumferential portions of said recesses,—of locking keys of double wedge-form adapted to be inserted in the transverse portions of the recesses, to force the lugs tightly into position, to also effect a tight wedging radially between the band and the rim and to retain the several parts in their locked positions.

In testimony whereof, I have signed my name to this specification, in the presence of two subscribing witnesses.

HARRY HINE REPLOGLE.

Witnesses:
 WILLIAM P. McFEAT,
 JOHN A. O'KEEFE.